United States Patent
Bode

[11] 3,969,021
[45] July 13, 1976

[54] MOTION PICTURE CAMERA WITH SOUND RECORDING MEANS

[75] Inventor: Kurt Bode, Braunschweig, Germany

[73] Assignee: Rollei-Werke Franke & Heidecke, Braunschweig, Germany

[22] Filed: Apr. 18, 1975

[21] Appl. No.: 569,355

[30] Foreign Application Priority Data
May 29, 1974 Germany............................ 2426293

[52] U.S. Cl..................................... 352/27; 352/14
[51] Int. Cl.².......................................... G03B 31/02
[58] Field of Search ..................... 352/14, 27, 29, 30

[56] References Cited
UNITED STATES PATENTS

| | | | |
|---|---|---|---|
| 3,246,944 | 4/1966 | Winkler.......................... | 352/174 X |
| 3,694,060 | 9/1972 | Tadie..................................... | 352/14 |
| 3,825,327 | 7/1974 | Kosarko................................ | 352/14 |

*Primary Examiner*—Monroe H. Hayes
*Attorney, Agent, or Firm*—Stonebraker, Shepard & Stephens

[57] ABSTRACT

A motion picture camera having a magnetic sound recording head, a pressure plate for holding the film tight against the sound head, a capstan driven at a uniform rate for advancing the film uniformly past the sound head, a drum for holding the film tight against the capstan and a sensor or feeler for sensing the film loop between the optical film gate and the sound recording head. The capstan and the recording head are mounted in stationary locations on one side of a mounting plate, the flywheel of the capstan is located on the opposite side of the mounting plate, and the pressure plate, the drum, and the feeler are mounted on a lever which swings in a plane parallel to the mounting plate and is located on the same side of the mounting plate as the capstan and recording head. Operating linkages swing the lever to its engaged position (pressing the film against the recording head and the capstan) automatically when the camera release member or trigger is moved to picture-taking position, and swing the lever to a disengaged position (with the pressure plate away from the sound head and the drum away from the capstan) when the shutter trigger is released to stop the picture taking operation. Certain electrical switches for controlling the capstan drive and the film advancing claw are opened and closed automatically.

8 Claims, 2 Drawing Figures

MOTION PICTURE CAMERA WITH SOUND RECORDING MEANS

BACKGROUND OF THE INVENTION

It is known in the art to provide a motion picture camera (especially a small camera for amateur use) with sound recording means comprising a magnetic recording head, a capstan for advancing the film at a uniform rate past the recording head, a pressure member which presses the film strip tightly against the magnetic head, a drum or puck which presses the film against the capstan to provide a frictional drive of the film by the capstan, and a loop sensor or feeler for sensing the film loop between the optical film gate and the recording head. In the usual known construction, the magnetic recording head and the capstan are mounted in fixed locations in the camera, whereas the pressure member, the drum, and the loop feeler are adapted to be removed from their operating positions, to leave space for inserting the film strip when the camera is being loaded with fresh film.

In prior cameras of this type, it has been customary to make the pressure member, the capstan, and the loop feeler each individually movably guided in a separate slit or guideway in a mounting plate fastened in the camera, and connected with each other and with a control member by a lever mechanism which, upon actuation of the control member, moves the pressure member, the drum, and the loop feeler simultaneously out of their operating positions. In the prior art, the lever mechanism is arranged on what may be called the rear of the mountng plate, in order not to interfere with the guidance of the film in the vicinity of the magnetic head, the pressure plate, the capstan and drum, and the loop feeler. Since it is necessary to have a flywheel of considerable mass and large dimensions to insure absolute constancy of speed of the capstan, the flywheel has also been arranged on the rear of the mounting plate, that is, the opposite side of the plate from that on which the recording head and capstan are placed. Because of the relatively large dimensions of the flywheel, it cannot be arranged in a plane with the lever mechanism, and therefore (according to the prior art) must be in a location spaced from the rear surface of the mounting plate, to allow room for the lever which controls the position of the pressure member and drum to move close to the rear surface of the mounting plate, between it and the flywheel. In other words, the flywheel must be spaced from the rear surface of the mounting plate by a space a trifle greater than the thickness of the lever which is to move in this space. This undesirably increases the thickness of the assembly, making it unsuitable for installation in a compact narrow motion picture camera, such as used for narrow film, e.g., 8 millimeter film. Also, there is a relatively high cost for precision machining of the parts, in the above described construction used in the prior art.

SUMMARY OF THE INVENTION

Accordingly, in order to overcome the disadvantages above mentioned which exist in the prior art, an object of the present invention is to provide sound recording means in which the mechanical coupling of the moving parts is considerably simplified and at the same time the structural depth or thickness of the sound assembly is substantially reduced, making the assembly more suitable in a compact motion picture camera of the kind taking narrow film for amateur use.

This object is achieved, according to the present invention, by mounting the pressure member, the drum, and the feeler all on a lever which swings in a plane parallel to the mounting plate, on the front thereof, that is, the side on which the recording head and the capstan are mounted. With no operating lever required on the rear of the plate, the capstan can then be mounted very close to the rear surface of the plate, thus decreasing the thickness or depth of the assembly, making it more suitable for a narrow camera. In a direction perpendicular to the mounting plate, the thickness of the mounting lever on the front of the plate does not undesirably increase the thickness of the camera, because a substantial amount of free space is needed anyhow on the front side of the mounting plate, to accommodate the width of the film strip. The lever and associated parts have only a very slight additional depth (thickness in a direction perpendicular to the mounting plate) than the width of the film strip.

A still further advantage is obtained by this arrangement, in that the bringing of the flywheel on the rear of the plate very close to the rear face of the plate enables it to be that much closer to the capstan projecting from the front surface of the plate, thereby making the capstan and flywheel assembly more rigid, and less liable to vibration or wobbling, which is especially important because there is usually only a single rather narrow bearing in which the capstan-flywheel assembly is mounted for rotation, and a longer life and greater precision of operation is achieved when the parts are brought closer together in accordance with the present invention.

According to one advantageous embodiment of the invention, the mounting lever above mentioned is divided in two parts, a main part on which the pressure plate and the loop feeler are mounted, and a second or supplementary lever mounted on the main part, the drum being mounted on this second part of the lever, which is spring pressed toward the first part. This enables an easy adjustment to make sure that the pressure plate presses the film with its desired pressure force against the film traveling over the recording head, and that the drum presses the film with its desired force against the capstan.

In another desirable development of the invention, the lever is moved between its operative and inoperative positions by what may be called a snap action or dead center linkage. This linkage is moved in an operative direction by movement of the camera trigger or release member toward picture-taking position, and moved in the opposite direction by a retracting spring when the camera trigger is released to stop the picture taking operation. Until the linkage reaches dead center in either direction, no movement of the above described mounting lever takes place, but as soon as the dead center position is passed, the mechanism quickly snaps the mounting lever to the opposite position, from effective position to ineffective, or vice versa.

In still another development of the invention, the movement of the snap action linkage controls an electric switch for the film advancing motor, and the movement of the camera trigger or release member controls an electric switch for the capstan drive motor. Because of the lost motion of the snap action mechanism, the first part of the motion of the trigger or release member in a picture-taking direction closes the switch of the capstan motor so that this motor can start operation and can get the capstan up to proper operative speed before the snap action mechanism closes the switch to the film advance motor an instant later. At the moment the drum comes up against the capstan (that is, against the film interposed between the drum and the capstan) the capstan is already operating at the proper speed. The annoying distortions of sound which occur when the film is pressed against a capstan not yet operating at full speed, are thus avoided.

DESCRIPTION OF THE PREFERRED EMBODIMENT

Figure 1:
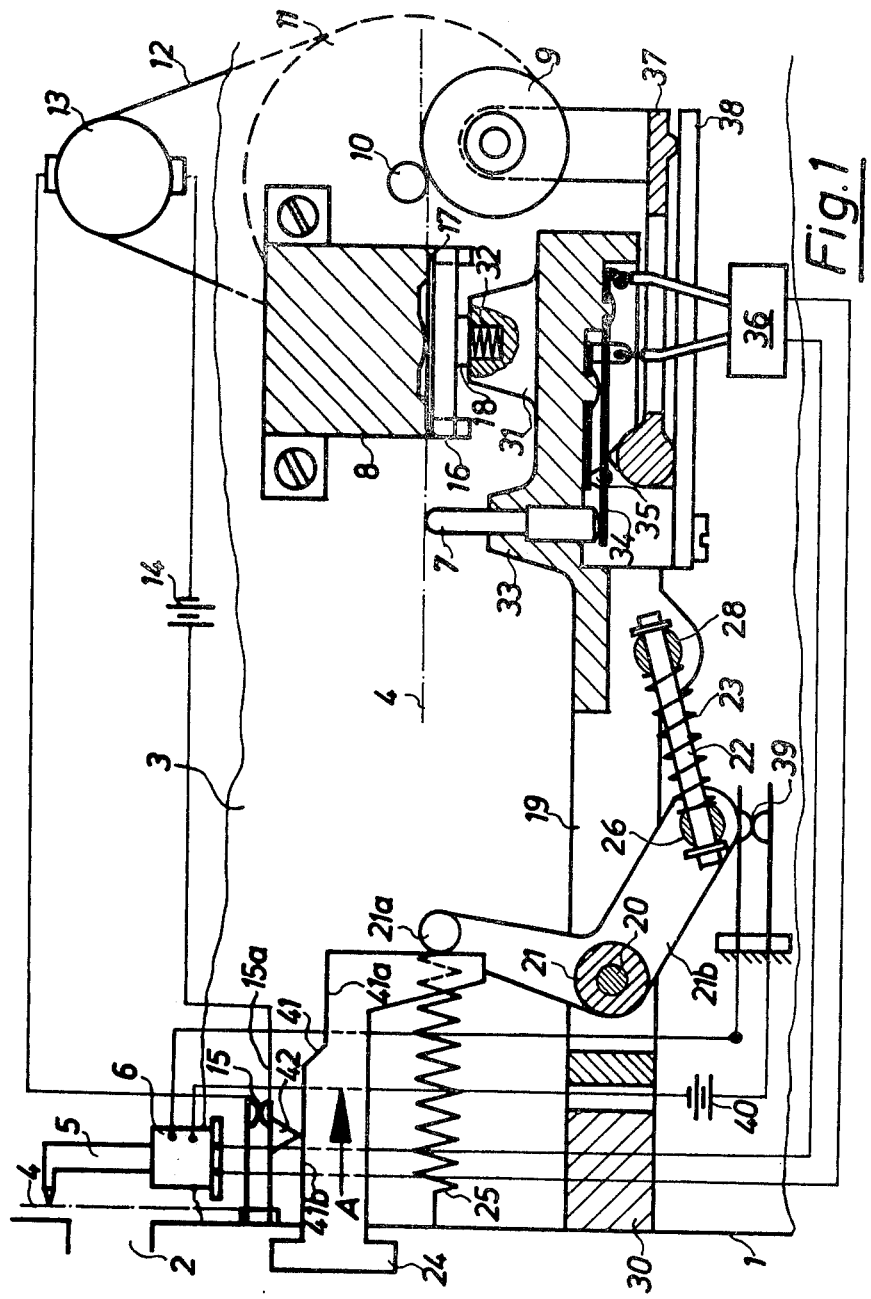
FIG. 1 is a somewhat schematic or diagrammatic vertical longitudinal section through a camera in accordance with a preferred embodiment of the invention, with parts omitted, the section being taken approximately on the line 1—1 of FIG. 2.
Figure 2:
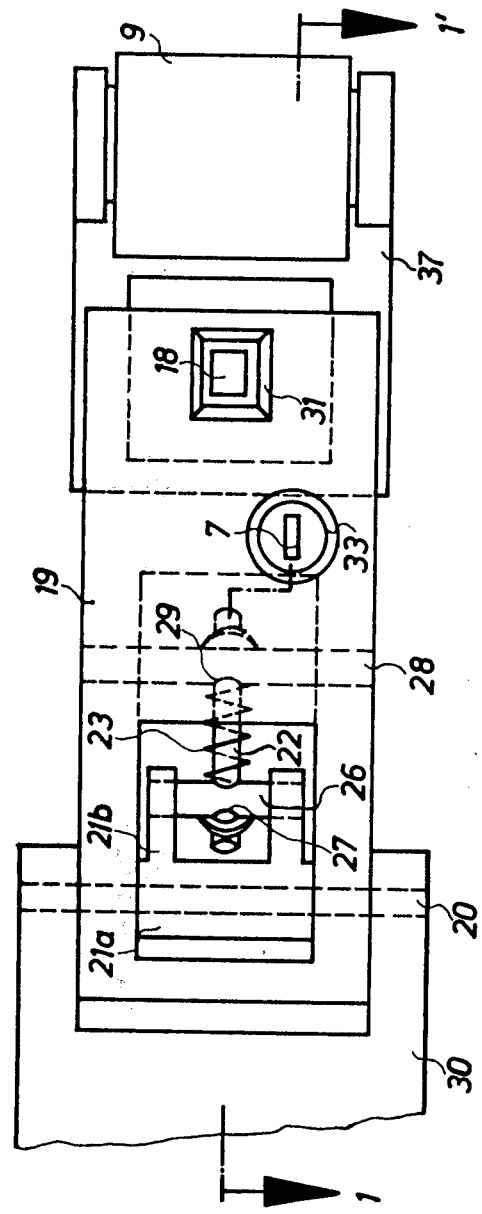
FIG. 2 is a plan, on an enlarged scale, of the mounting lever and the pressure plate, the drum, the loop feeler mounted thereon, and associated parts.

Referring now to the drawings, the camera body in general is indicated schematically at 1 and it has a film gate indicated schematically at 2, past which the film indicated at 4 is advanced intermittantly or step-by-step by the usual conventional film feeding claw 5 driven by the motor 6. The film is guided over a film loop feeler or sensor 7, past the magnetic recording head 8, and thence passes between a drum 9 and a capstan 10, and proceeds on to a take-up reel, not shown.

Mounted vertically within the camera body is a mounting plate indicated schematically at 3. The surface of the plate shown in FIG. 1 may be called the front or first face of the plate. The magnetic recording head 8 is mounted in fixed position on the front face of the plate. The capstan 10 projects through the plate in a fixed location, but of course is rotatable in a suitable bearing, not shown. The flywheel 11 of the capstan, firmly secured to the capstan, lies on the rear of the plate 3, closely adjacent to the rear face of the plate, with just enough clearance so that it does not bind or rub against the rear face of the plate. The flywheel is driven by a belt 12 or other suitable drive mechanism, from a constant-speed capstan motor 13 mounted in any suitable location on the plate 3 or on some other part of the camera body. Aa battery 14 provides current for operating the capstan motor 13, the motor circuit being opened and closed by a switch 15.

As the film strip 4 moves past the recording head 8, it is guided by conventional guide members or projections 16 and 17 mounted on the recording head. The film is pressed with the proper degree of firmness against the recording head, by a pressure plate 18.

A mounting lever 19 is mounted for oscillation on a pivot 20 between two arms of a forked member 30 which is fastened in fixed position either to the mounting plate 3 or to some fixed part of the camera body 1. On this same shaft or pivot 20, within a central opening of the lever 19, there is a toggle lever or snap-action lever 21 in the form of bellcrank having one arm 21a and a second arm 21b. The arm 21b is bifurcated or forked, and a cross pin 26 (parallel to the pivot 20) extends between the two portions of the arm 21b and is rotatable therein. A pin 22 has its left end (when viewed as in FIG. 1) extending slidably through the bore in the pin 26, and its right end extending slidably through a similar diametrical bore in the cross pin 28 (also parallel to the pivot 20) which is rotatable in the two side portions of the main lever 19. A coiled compression spring 23 surrounds the pin 22 between the two pins 26 and 28. Suitable fasteners at the ends of the pin 22 prevent it from becoming dislodged axially from the pins 26 and 28.

With this construction, it is apparent that the bellcrank lever 21 and the rod 22 and associated parts, will act as a snap-action switch or mechanism for changing the position of the main mounting lever 19. When the bellcrank lever 21 is in the position illustrated in FIG. 1, the spring 23 presses obliquely in an upward direction on the lever 19, thus holding the pressure plate 8, the drum 9, and the feeler 7 in their operative positions. If the bellcrank lever 21 is swung counterclockwise from the position shown in FIG. 1, so that the pin 26 carried by the bifurcated arm 21b is raised to a position above the main lever 19, then the pressure exerted by the spring 23 will be obliquely downwardly, and the lever 19 and parts carried thereby will be shifted downwardly to the ineffective or inoperative position. When the lever 21 swings in one direction or the other, no motion will be imparted until the lever reaches its dead center position, and then when it passes dead center position, the snap action will occur, to move the mounting lever 19 quickly in one direction or the other.

Near the free end of the mounting lever 19, on its upper surface, in a position opposite the recording head 8, there is a boss or frustum 31 having a bore receiving the stem of the pressure plate 18, and a compression spring 32 tending to move the pressure plate upwardly. A slight distance leftwardly from the boss 31 (that is, toward the pivot 20) is a second boss or frustum 33 with a bore in which is slidably mounted the loop feeler or sensor 7. A contact leaf spring 34 mounted on the under surface of the lever 19 tends to press the feeler 7 upwardly as far as permitted by a shoulder on the feeler. Electric switch contacts indicated schematically at 35 are controlled by the upward or downward movement of the leaf spring 34 in such a way that when the feeler 7 moves upwardly, indicating an increase in the size of the film loop which is sensed by the feeler 7, the switches operate a control circuit 36 of known form to reduce the speed of the motor 6 which drives the film advancing claw 5. When the film strip becomes tighter, decreasing the size of the loop, this causes the sensor 7 to move downwardly against the force of the leaf spring 34, and this operates the switch 35 to give a signal to the control circuit 36 to speed up the film advancing motor 6.

The mounting lever has two parts, the main portion 19 already described, and a supplementary portion 37 lying below the free end of the main portion 19. The left end (viewed as in FIG. 1) is pivoted to the main portion 19 of the lever, and the right end of the supplementary portion or extension arm 37 is pressed upwardly by a leaf spring 38 mounted on the main portion 19, so that the extension 37 tends to lie against the bottom of the portion 19. The right end of this extension portion 37 has bearings in which the drum 9 is rotatably mounted. When the mounting lever 19 is in its upward or effective operating position, shown in FIG. 1, the leaf spring 38 serves to press the drum 9 against the capstan 10 (or rather, against the interposed film 4) with the desired degres of pressure, just as the spring 32 presses the pressure plate 18 against the film with the desired degree of pressure at this point.

Within the range of swing of the lever arm 21b of the toggle lever or snap-action lever 21, there is arranged a pair of switch contacts 39 connected in the circuit of the film advancing claw motor 6, which is powered by the battery 40. The arrangement is such that when the lever 19 is in its operating position, with the toggle lever 21 swung to its clockwise position illustrated in FIG. 1, the contacts 39 are closed to start the film advancing motor 6. In the rest position of the control lever 21 (counterclockwise from the position illustrated in FIG. 1) with the mounting lever 19 in its lower or inoperative position, the contacts 39 are open, stopping the supply of current to the film advance motor 6. In this lower position of the mounting lever 19, the pressure plate 18 and the drum 9 are some distance below the recording head 8 and capstan 10, respectively, allowing space of insertion of a fresh supply of photographic film.

The camera release member or trigger member schematically shown at 24, is pressed inwardly (to the right as in FIG. 1, in the direction of arrow A) in order to start the camera to take pictures. A cam edge on the release member 24 has an oblique cam rise portion 41, with a low cam portion 41a at one end of the rise portion, and a high cam portion 41b at the high end of the portion 41. A cam follower 42 operates a contact spring 15a of the switch 15 which controls the circuit of the capstan motor 13. When the camera release or trigger is not operated, the follower 42 is on the lower part 41a of the cam, and the switch 15 is open, so that the capstan motor 13 does not operate. When the release plunger 24 is pushed inwardly, the cam follower 42 is raised onto the cam portion 41b, closing the switch 15 to start the operation of the capstan motor. The pressing inward of the release 24 causes a part of the release to press on the portion 21a of the toggle lever 21, swinging it clockwise to the operative position shown in FIG. 1. When finger pressure on the camera release or trigger 24 is removed, the spring 25 swings the toggle lever 21 counterclockwise to its ineffective position, and at the same time moves the release 24 outwardly (leftwardly) to the inoperative position.

The shape of the cam portions 41, 41a, and 41b is so designed that as the camera release member 21 moves inwardly, the switch 15 will be closed to start the capstan motor 13, a little before the toggle lever or operating lever 21 moves to its dead center position, so that the capstan motor 13 has a chance to start up and reach its full operating speed before the lever 21, upon reaching just beyond its dead center position, swings fully clockwise to close the contacts 39 to start the film advance motor 6. This assures the proper speed of the capstan 10 before the film is pressed against the capstan, thus assuring that the film is traveling past the recording head 8 at proper speed before any recording is commenced.

It is believed that the operation of the construction will be readily apparent from what has been said above, but it may be briefly summarized as follows:

When motion pictures are to be taken, the camera release 24 is pressed in the direction of the arrow A, which first closes the contact 15 to start the capstan motor 13. Further inward movement of the release 24 swings the control lever 21 in a clockwise direction to and beyond its dead-center position, whereupon its snaps fully to its extreme clockwise position, so that the spring 23 causes the upward swinging of the mounting lever 19 to bring the pressure plate 18 up to its operative position pressing film against the recording head, and to bring the drum 9 up to its operative position pressing the film against the capstan which is now rotating at the proper speed, to advance the film past the recording head 18. At the same time, the swinging of the control lever 21 to its extreme position serves to close the contact 39, starting the film advancing motor 6. The desired sound track is recorded on the film 4 as it moves past the sound recording head 8 at a uniform rate controlled by the uniform rotation of the capstan 10.

If the camera release is now let go (that is, if finger pressure on the release or trigger 24 is removed) the spring 25 swings the control lever 21 in a counterclockwise direction to its ineffective position, and at the same time moves the release 24 leftwardly in a direction opposite to the direction of the arrow A. The first part of the counterclockwise movement of the control lever 21 releases the switch contacts 39 so that the film advance motor 6 is stopped. As the swinging of the control lever 21 in a counterclockwise direction continues, this lever reaches its dead-center position (with the pivots 20, 26, and 28 all lying in the same plane) and when it swings further, slightly beyond its dead-center position, the spring 23 pushes obliquely downwardly on the pivot 28, producing a downward force on the mounting lever 19, which then quickly swings, by snap action, to its downward or ineffective position, removing the pressure plate 18 and the drum 9 and the feeler 7 from the recording head 8 and capstan 10. At the same time, the outward or leftward motion of the release plunger 24, causes the cam follower 42 to open the switch 15, stopping the operation of the capstan motor 13.

It will be seen that this construction has all of the advantages above mentioned, and avoids the disadvantages of the prior art constructions in a simple and relatively inexpensive manner, suitable for use in a very thin and compact motion picture camera.

What is claimed is:

1. A motion picture camera with sound recording means, comprising a recording head and a capstan mounted in fixed locations in the camera, a mounting lever in the camera, said mounting lever being swingable between an effective position and an ineffective position, a film loop sensor for sensing a loop in said film strip, a pressure plate for pressing the film strip against said recording head, and a drum for pressing the film strip against said capstan, said loop sensor, plate, and drum being mounted on said mounting lever to move bodily therewith between respective effective and ineffective positions, spring means for respectively biasing said loop sensor, plate, and drum relative to said mounting lever, a mounting plate having a front surface and a rear surface, and a flywheel operatively connected to said capstan, said flywheel being located on the rear side of said mounting plate in close proximity to the rear face thereof, said recording head being mounted on the front surface of said plate, said capstan projecting forwardly from the front surface of the plate, and said mounting lever being arranged along said front surface of said plate and swinging in a direction substantially parallel to the front surface of said plate.

2. The invention defined in claim 1, further comprising a film transport motor, an electric switch for causing operation of said transport motor when the switch is closed, and means for closing said switch concomitantly with movement of said mounting lever from its ineffective position to its effective position.

3. The invention defined in claim 1, wherein said mounting lever has a main portion on which said pressure plate is mounted and a supplementary extension portion on which said drum is mounted, said supplementary portion being mounted on said main portion for limited swinging movement relative thereto, and spring means tending to move said supplementary portion to a predetermined limit position relative to said main portion.

4. The invention defined in claim 3, wherein said pressure plate is mounted on the top of said main portion, and said supplementary portion is pivotally mounted on the bottom of said main portion and projects beyond a free end of said main portion, and said drum is mounted on the projecting end of said supplementary portion, and said spring means is a leaf spring fastened to said main portion.

5. The invention defined in claim 1, wherein said effective position and ineffective position of said mounting lever constitute limit positions, further comprising dead center control means effective when moved in one direction past a dead center position to shift said mounting lever to one of its limit positions and effective when moved in the opposite direction past a dead center position to shift said mounting lever to the other of its limit positions.

6. The invention defined in claim 5, further comprising a camera release member for initiating a picture taking operation of the camera, and means for moving said dead center control means in one direction by operation of said release member.

7. The invention defined in claim 1, further comprising a capstan drive motor, an electric switch for causing operation of said capstan drive motor when the switch is closed, a camera release member for initiating a picture taking operation of the camera and concomitantly swinging said mounting lever from its ineffective position to its effective position, and means responsive to actuation of said release member for closing said switch prior to completion of swinging said mounting lever to its effective position.

8. The invention defined in claim 7, wherein said effective position and ineffective position of said mounting lever constitute limit positions, further comprising dead center control means effective when moved in one direction past a dead center position to shift said mounting lever to one of its limit positions and effective when moved in the opposite direction past a dead center position to shift said mounting lever to the other of its limit positions, a film transport motor, an electric switch for causing operation of said transport motor when the switch is closed, and means for closing said transport motor switch concomitantly with movement of said mounting lever from its ineffective position to its effective position.

* * * * *